US012735105B2

(12) United States Patent
Kwon

(10) Patent No.: US 12,735,105 B2
(45) Date of Patent: Sep. 15, 2026

(54) APPARATUS AND METHOD FOR ADJUSTING STEERING WHEEL

(71) Applicants: HYUNDAI MOTOR COMPANY, Seoul (KR); KIA CORPORATION, Seoul (KR)

(72) Inventor: Young Taek Kwon, Gwangmyeong-si (KR)

(73) Assignees: HYUNDAI MOTOR COMPANY, Seoul (KR); KIA CORPORATION, Seoul (XK)

( * ) Notice: Subject to any disclaimer, the term of this patent is extended or adjusted under 35 U.S.C. 154(b) by 345 days.

(21) Appl. No.: 17/872,837

(22) Filed: Jul. 25, 2022

(65) Prior Publication Data

US 2023/0097388 A1 Mar. 30, 2023

(30) Foreign Application Priority Data

Sep. 30, 2021 (KR) ........................ 10-2021-0130136

(51) Int. Cl.
*B62D 15/02* (2006.01)
*B62D 1/181* (2006.01)

(52) U.S. Cl.
CPC .......... *B62D 15/0245* (2013.01); *B62D 1/181* (2013.01)

(58) Field of Classification Search
None
See application file for complete search history.

(56) References Cited

U.S. PATENT DOCUMENTS

2012/0143373 A1 6/2012 Park
2015/0343951 A1* 12/2015 Kim .................. B60G 17/0195 701/42
2017/0131095 A1* 5/2017 Kim ..................... B62D 5/0466
2017/0314317 A1 11/2017 Fischbein et al.
2019/0270484 A1* 9/2019 Youn .................... B62D 5/0457
2021/0252707 A1* 8/2021 Wang ..................... B25J 9/1671
2021/0293534 A1* 9/2021 Müller .................. G01B 11/26

FOREIGN PATENT DOCUMENTS

DE 102010054222 A1 8/2011
DE 102016010762 A1 * 4/2017 ........... B62D 15/021
DE 102016118593 A1 4/2018
DE 102018219139 A1 9/2019

(Continued)

OTHER PUBLICATIONS

English machine translation of DE 102016010762 A1. (Year: 2026).*

*Primary Examiner* — Adam D Tissot
*Assistant Examiner* — Charles Pall
(74) *Attorney, Agent, or Firm* — MCDONNELL BOEHNEN HULBERT & BERGHOFF LLP

(57) ABSTRACT

Disclosed are an apparatus and method for adjusting a steering wheel, the apparatus including an image capturing unit configured to capture images of a current state of a steering wheel at multiple angles, an analysis unit configured to create leveling information on zero adjustment of the steering wheel by processing the image acquired by the image capturing unit, and a control unit configured to calculate an error from preset reference leveling information depending on the leveling information created by the analysis unit and performing the zero adjustment on the steering wheel by controlling a drive unit for operating the steering wheel depending on the calculated error.

9 Claims, 9 Drawing Sheets

(56) References Cited

FOREIGN PATENT DOCUMENTS

| | | | | |
|---|---|---|---|---|
| EP | 2335885 | A1 * | 6/2011 | ......... G05B 19/4182 |
| JP | 2019-530607 | A | 10/2019 | |
| KR | 1020120033831 | A | 4/2012 | |
| KR | 101189568 | B1 | 10/2012 | |
| KR | 101745176 | B1 | 6/2017 | |
| KR | 101839354 | B1 | 3/2018 | |
| KR | 10-2019-0057116 | A | 5/2019 | |
| KR | 1020190104735 | A | 9/2019 | |
| WO | WO-2021220679 | A1 * | 11/2021 | ................ B25J 5/00 |

* cited by examiner

APPARATUS AND METHOD FOR ADJUSTING STEERING WHEEL

CROSS REFERENCE TO RELATED APPLICATION

The present application claims priority to Korean Patent Application No. 10-2021-0130136, filed Sep. 30, 2021, the entire contents of which is incorporated herein for all purposes by this reference.

BACKGROUND

Field

The present disclosure relates to an apparatus and method for adjusting a steering wheel, which uniformizes quality of zero adjustment and reduces the number of work processes by processing information on images of a lateral side and a front side of a steering wheel to measure errors related to column tilting and zero adjustment and rotating the steering wheel by controlling a drive motor depending on the error, in order to solve problems with a leveler, which is a device used directly by an operator to perform zero adjustment on a rotation angle of the steering wheel of a vehicle.

Description of the Related Art

A process of adjusting wheel alignment of a vehicle is generally performed before the vehicle is delivered. Further, before the process, a rotation angle of a steering wheel of a steering system of the vehicle needs to be calibrated to zero. Otherwise, the wheel will be off-center, wherein the steering wheel rotates at a predetermined angle even though the vehicle travels straight. Therefore, even though the steering wheel is set to zero by appropriately performing the wheel alignment to allow the vehicle to travel straight, the off-center wheel of the vehicle causes the vehicle to be lopsided to one side.

Therefore, a device called a leveler can be used by an operator to adjust the wheel off-center of the vehicle to sense and adjust the rotation angle of the steering wheel. To perform the zero adjustment (zero-point calibration) on the steering wheel, the leveler includes a main body having a monitor and a gyro sensor, a contact unit extended from the inside of the main body and configured to bring the main body into close contact with a front glass of the vehicle, and a fixing unit configured to fix the main body to the steering wheel. However, the amount of rotation angle that is adjusted by the leveler may vary depending on the fixing position, which causes a problem of non-uniformity of the zero adjustment.

The foregoing explained as the background is intended merely to aid in the understanding of the background of the present disclosure, and is not intended to mean that the present disclosure falls within the purview of the related art that is already known to those skilled in the art.

SUMMARY

The present disclosure is proposed to solve these problems and aims to provide an apparatus and method for adjusting a steering wheel, which uniformize quality of zero adjustment and reduce the number of work processes by processing information on images of a lateral side and a front side of a steering wheel to measure an error related to column tilting and zero adjustment and rotating the steering wheel by controlling a drive motor depending on the error in order to solve a problem with a leveler which is a device used directly by an operator to perform zero adjustment on a rotation angle of the steering wheel of a vehicle.

An apparatus for adjusting a steering wheel according to the present disclosure may include an image capturing unit configured to capture images of a current state of a steering wheel at multiple angles, an analysis unit configured to create leveling information on zero adjustment of the steering wheel by processing the image acquired by the image capturing unit, and a control unit configured to calculate an error from preset reference leveling information depending on the leveling information created by the analysis unit and performing the zero adjustment on the steering wheel by controlling a drive unit for operating the steering wheel depending on the calculated error.

The image capturing unit may further include an obstacle detection sensor, and the obstacle detection sensor may detect an obstacle on a route along which the image capturing unit enters or exits an interior of a vehicle having the steering wheel to capture the image of the current state of the steering wheel.

When a door glass of the vehicle is detected as an obstacle on the route, the control unit may perform control to open the door glass of the vehicle.

The analysis unit may measure a tilting angle of the steering wheel by processing an image of a lateral side of the current state of the steering wheel acquired by the image capturing unit and create the leveling information on the zero adjustment of the steering wheel corresponding to the measured tilting angle.

The analysis unit may measure a wheel off-center angle of the steering wheel by processing an image of a front side of the current state of the steering wheel acquired by the image capturing unit and create the leveling information on the zero adjustment of the steering wheel corresponding to the measured wheel off-center angle.

The analysis unit may further include a shape learning unit configured to create reference leveling information by extracting a plurality of feature points related to a wheel shape from an image of a front side of the steering wheel.

The analysis unit may create the leveling information on the zero adjustment of the steering wheel by extracting the plurality of feature points related to the wheel shape from the image of the front side of the steering wheel acquired by the image capturing unit.

The image capturing unit may further include a focal point adjustment unit having a plurality of reference points for performing the zero adjustment on a focal point of the captured image.

A method of adjusting a steering wheel according to the present disclosure may include: capturing, by an image capturing unit, images of a current state of a steering wheel at multiple angles; creating, by an analysis unit, leveling information on zero adjustment of the steering wheel included in the steering wheel by processing the image acquired by the image capturing unit; and calculating, by a control unit, an error from preset reference leveling information depending on the leveling information created by the analysis unit, controlling a drive unit of the steering wheel depending on the calculated error, and performing the zero adjustment on the drive unit.

The method may further include, before the capturing of the images, detecting, by an obstacle detection sensor, an obstacle on a route along which the image capturing unit enters or exits an interior of a vehicle having the steering wheel to capture the image of the current state of the steering wheel.

In the creating of the leveling information, a tilting angle of the steering wheel may be measured by processing an acquired image of a lateral side of the current state of the steering wheel, and the leveling information on the zero adjustment of the steering wheel corresponding to the measured tilting angle may be created.

In the creating of the leveling information, a wheel off-center angle of the steering wheel may be measured by processing an acquired image of a front side of the current state of the steering wheel, and the leveling information on the zero adjustment of the steering wheel corresponding to the measured wheel off-center angle may be created.

The method may further include, before the creating of the leveling information, creating, by a shape learning unit, reference leveling information by extracting a plurality of feature points related to a wheel shape from an image of a front side of the steering wheel.

In the creating of the leveling information, the leveling information on the zero adjustment of the steering wheel may be created by extracting a plurality of feature points related to a wheel shape from the image of the front side of the steering wheel acquired by the image capturing unit.

The method may further include, before the capturing of the images, performing the zero adjustment on a focal point of the image captured depending on a plurality of reference points provided in a focal point adjustment unit.

According to the apparatus for adjusting the steering wheel and the method of managing the same according to the present disclosure, it is possible to uniformize quality of zero adjustment and reduce the number of work processes by processing information on images of the lateral side and the front side of the steering wheel to measure an error related to column tilting and zero adjustment and rotating the steering wheel by controlling the drive motor depending on the error in order to solve a problem with the leveler which is a device used directly by an operator to perform zero adjustment on a rotation angle of the steering wheel of the vehicle.

DETAILED DESCRIPTION

Specific structural or functional descriptions of exemplary embodiments of the present disclosure disclosed in this specification or application are exemplified only for the purpose of explaining the exemplary embodiments according to the present disclosure, the exemplary embodiments according to the present disclosure may be carried out in various forms, and it should not be interpreted that the present disclosure is limited to the exemplary embodiments described in this specification or application. Hereinafter, embodiments of the present disclosure will be described in detail with reference to the accompanying drawings.

Figure 1:
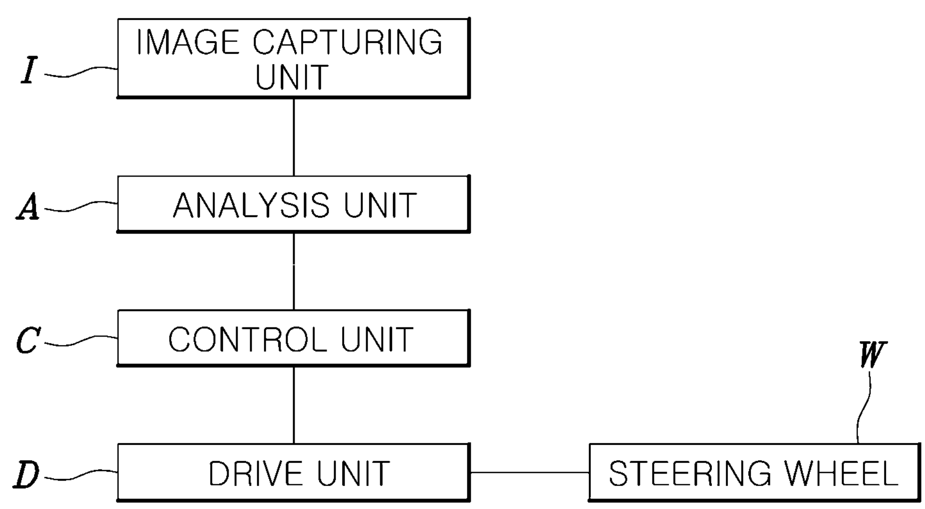
FIG. 1 is a schematic view of a steering wheel adjustment apparatus according to an embodiment of the present disclosure.
Figure 2:
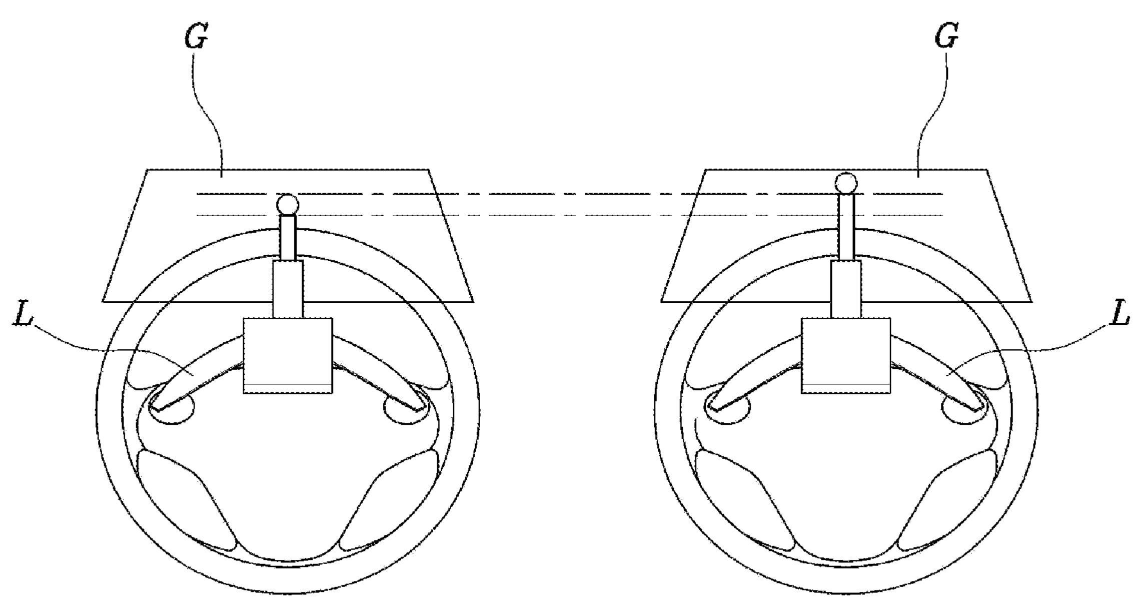
FIG. 2 is a view illustrating a traditional steering wheel adjustment apparatus.
Figure 3:
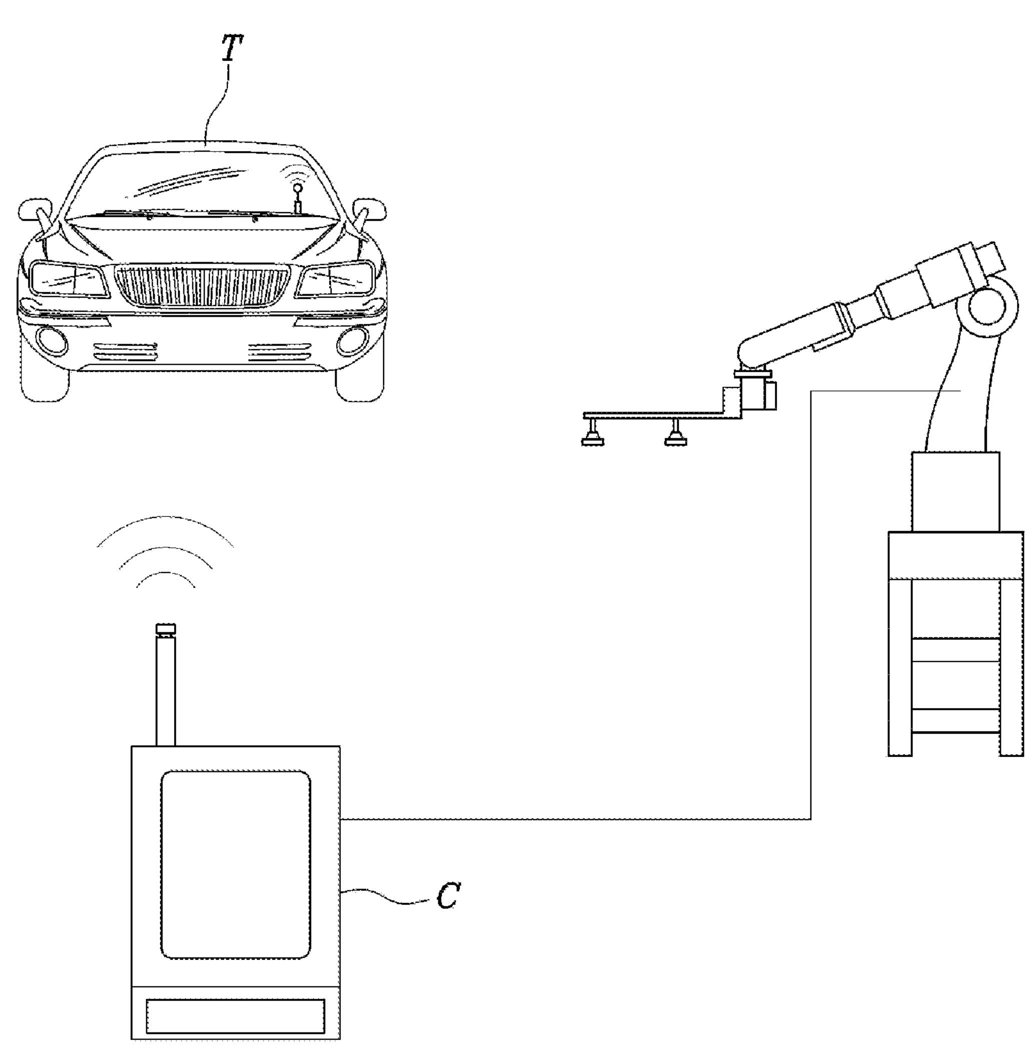
FIG. 3 is a view illustrating a control mechanism of the steering wheel adjustment apparatus according to the embodiment of the present disclosure.
Figure 4:
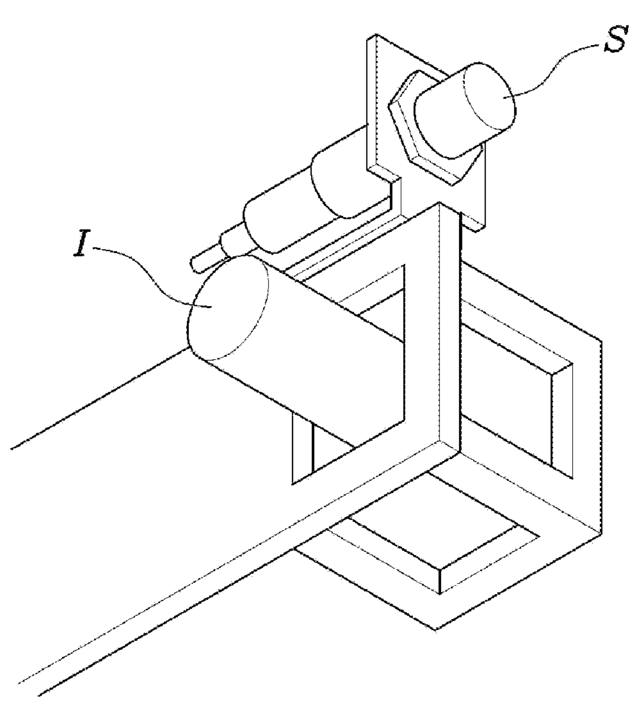
FIG. 4 is a view illustrating an obstacle detection sensor of the steering wheel adjustment apparatus according to the embodiment of the present disclosure.
Figure 5:
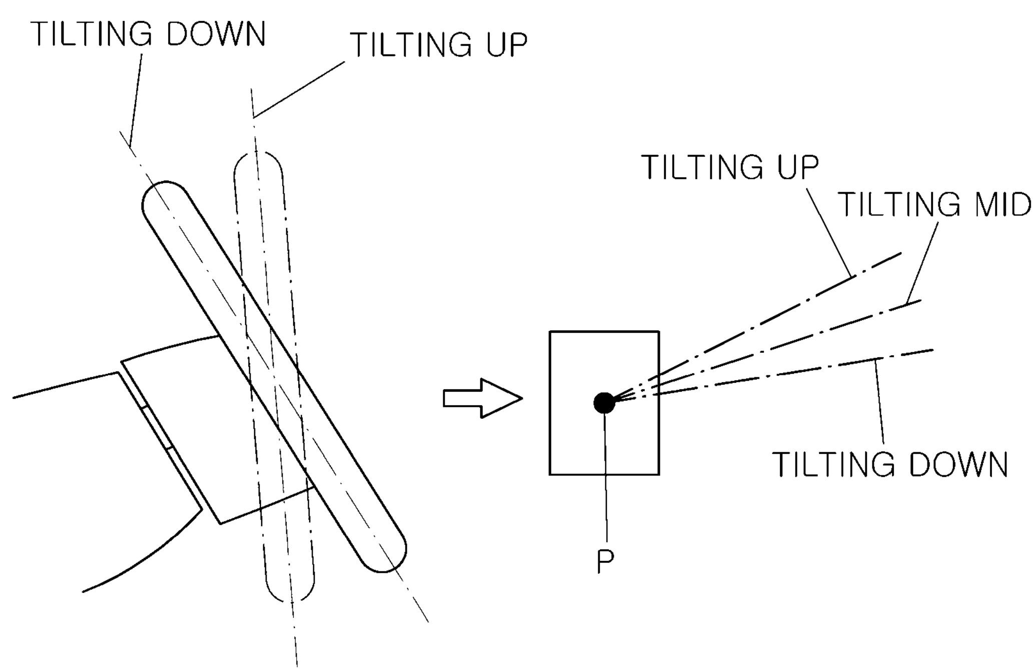
FIG. 5 is a view illustrating a tilting adjustment mechanism of the steering wheel adjustment apparatus according to the embodiment of the present disclosure.
Figure 6:
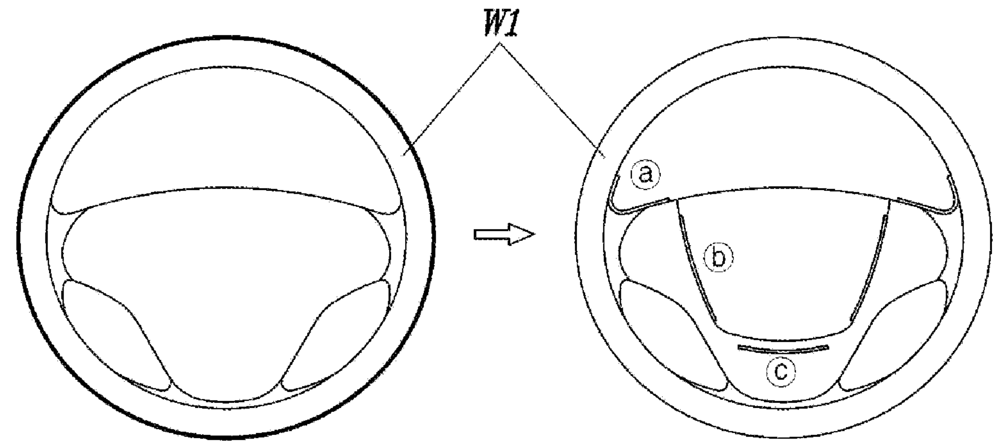
FIG. 6 is a view illustrating a wheel off-center adjustment mechanism of the steering wheel adjustment apparatus according to the embodiment of the present disclosure.
Figure 7:
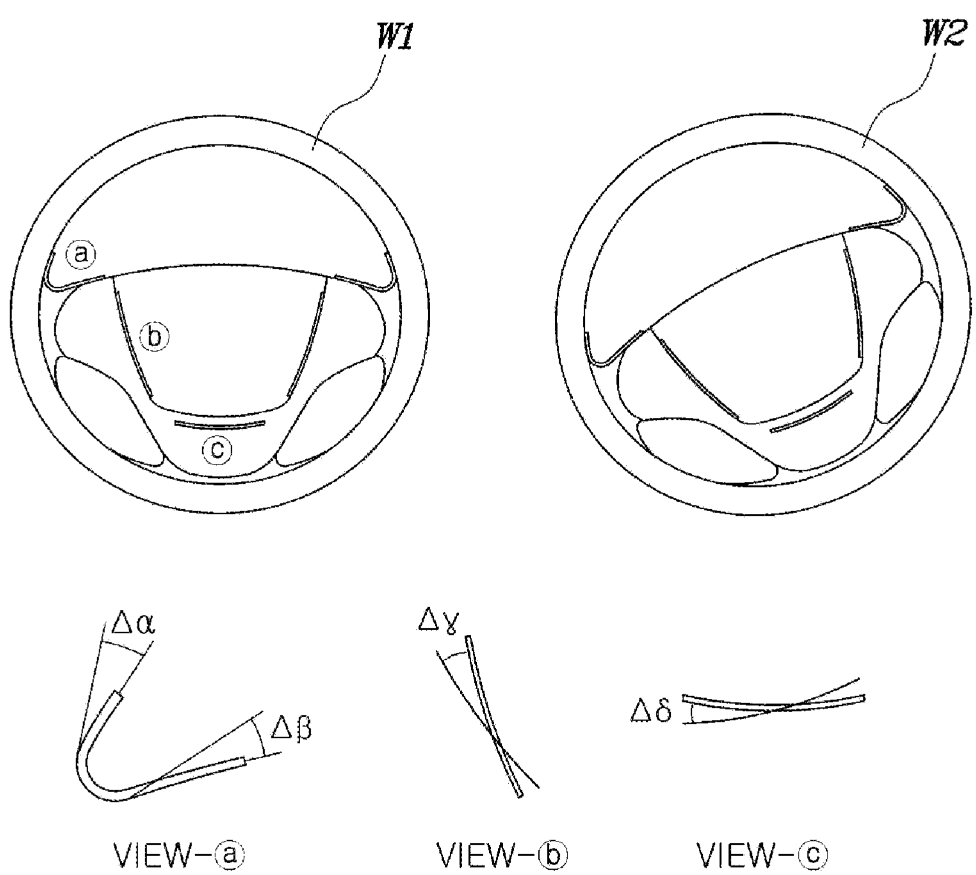
FIG. 7 is a view illustrating a wheel off-center adjustment mechanism of the steering wheel adjustment apparatus according to the embodiment of the present disclosure.
Figure 8:
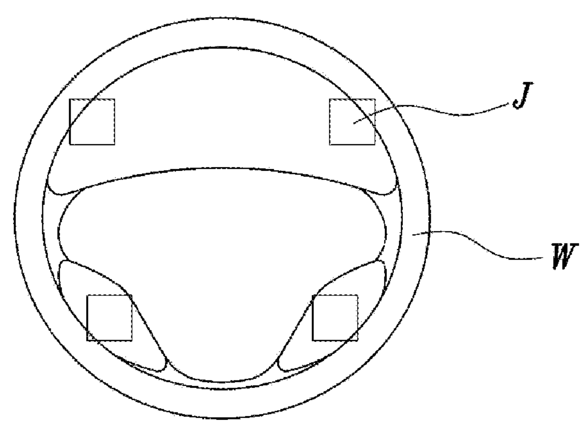
FIG. 8 is a view illustrating a wheel off-center adjustment mechanism of the steering wheel adjustment apparatus according to the embodiment of the present disclosure.
Figure 9:
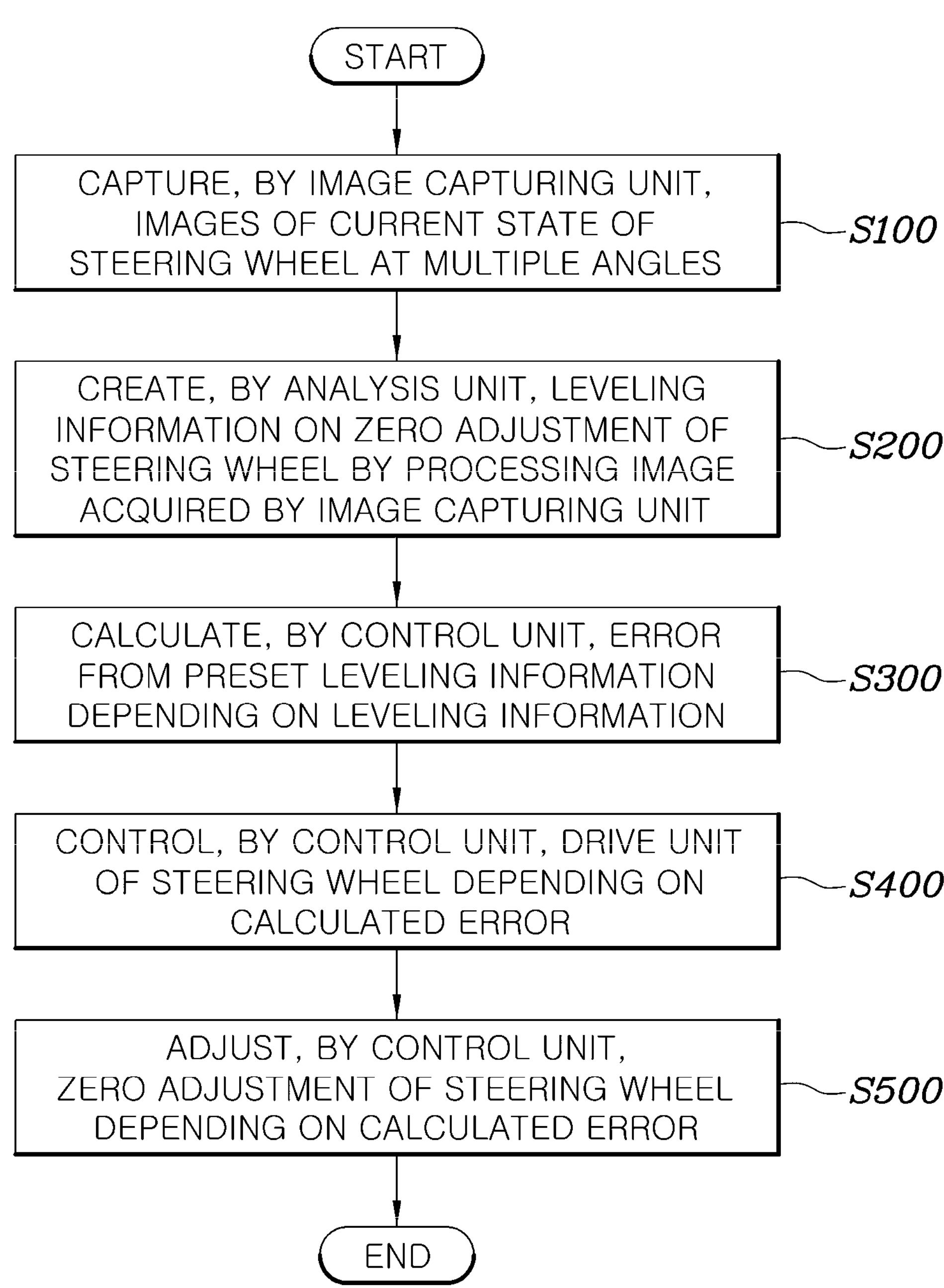
FIG. 9 is a flowchart of a steering wheel adjustment method according to the embodiment of the present disclosure.

FIG. 1 is a schematic view of a steering wheel adjustment apparatus according to an embodiment of the present disclosure, FIG. 2 is a view illustrating a traditional steering wheel adjustment apparatus, FIG. 3 is a view illustrating a control mechanism of the steering wheel adjustment apparatus according to the embodiment of the present disclosure, FIG. 4 is a view illustrating an obstacle detection sensor of the steering wheel adjustment apparatus according to the embodiment of the present disclosure, FIG. 5 is a view illustrating a tilting adjustment mechanism of the steering wheel adjustment apparatus according to the embodiment of the present disclosure, FIGS. 6 to 8 are views illustrating a wheel off-center adjustment mechanism of the steering wheel adjustment apparatus according to the embodiment of the present disclosure, and FIG. 9 is a flowchart of a steering wheel adjustment method according to the embodiment of the present disclosure.

FIG. 1 is a schematic view of a steering wheel adjustment apparatus according to an embodiment of the present disclosure. The steering wheel adjustment apparatus according to the embodiment of the present disclosure includes an image capturing unit I configured to capture images of a current state of a steering wheel at multiple angles, an analysis unit A configured to create leveling information on zero adjustment of the steering wheel included in the steering wheel by processing the images acquired by the image capturing unit, and a control unit C configured to calculate an error from preset reference leveling information depending on the leveling information created by the analysis unit, control a drive unit of the steering wheel depending on the calculated error, and perform the zero adjustment on the drive unit.

As illustrated in FIG. 1, the image capturing unit I captures the images of the current state of the steering wheel at multiple angles. In this case, the multiple angles include a front side and a lateral side of the steering wheel. An image capturing angle or a focal point of the image may be physically misaligned because of external factors such as physical impact. Therefore, the image capturing unit may further include a device for calibrating the image capturing unit by measuring the degree of misalignment.

The analysis unit A creates the leveling information on the zero adjustment of the steering wheel by processing the images acquired by the image capturing unit. In this case, the leveling information on the zero adjustment includes steering angle information such as a rotation angle depending on which whether the steering wheel is in a zero-adjusted state is determined, tilting information on an inclination angle of the lateral side of the steering wheel for performing the zero adjustment within a specific range, and telescopic information on a degree to which the steering wheel is adjusted upward and downward or forward or rearward. In addition, the leveling information includes information on the amount of control for controlling a tilt/telescopic device for ensuring a steering convenience for a driver and driving safety by adjusting motor-driven power steering (MDPS) for assisting the driver in steering, adjusting an inclination angle of a shaft to which the steering wheel is attached, adjusting a position of the steering wheel upward and downward (tilting motion), or pushing or pulling the steering wheel forward and rearward (telescopic motion) by operating the drive motor to adjust the steering wheel to the zero-adjusted state depending on information required for the zero adjustment or depending on whether the steering wheel is in the zero-adjusted state.

The control unit C calculates an error from the preset reference leveling information depending on the leveling information and performs the zero adjustment on the drive unit by controlling the drive unit of the steering wheel depending on the calculated error. In this case, the reference leveling information may be a database related to the corresponding types of steering wheels including information on the tilting/telescoping/wheel off-center as a leveling angle of the steering wheel which is zero-adjusted in a state in which the types of steering wheels are specified or has a difference corresponding to a reference error during the zero adjustment. Alternatively, the reference leveling information may be information on feature points that characterize the leveling angle of the steering wheel extracted by learning the images of the steering wheel at multiple angles in a state in which the types of steering wheels are specified depending on learning algorithms such as deep learning techniques or image processing techniques.

FIG. 2 is a view illustrating a steering wheel adjustment apparatus in the related art. As illustrated in FIG. 2, a steering wheel leveler L, which is a steering wheel adjustment apparatus in the related art, is operated manually. The steering wheel leveler L includes a fixing unit fixed to the steering wheel and the vehicle front glass by an operator, a fixing pusher including an adjustment unit for performing the zero adjustment by finely rotating the steering wheel by the operator, and a gyro sensor for detecting a rotation angle. Alternatively, the steering wheel adjustment apparatus in the related art is operated automatically. The steering wheel adjustment apparatus may perform the zero adjustment by finely and automatically rotating the steering wheel by forcibly operating an MDPS drive motor by means of communication with the vehicle.

However, as illustrated in FIG. 2, according to the related art, adjustment quality may be non-uniform in a step of fixing the steering wheel W and the vehicle front glass G by the operator. If the operator fixes the fixing unit and the vehicle front glass at different positions, the adjustment amount may vary during the process of adjusting (leveling) the steering wheel.

Alternatively, as illustrated in FIG. 2, according to the related art, the steering wheel may be rotated in different directions, i.e., clockwise (CW) or counterclockwise (CCW) during the process of performing the zero adjustment on the wheel off-center of the steering wheel by the operator, which may adversely affect the wheel alignment performed in accordance with the work specifications defined in the CW direction after leveling the steering wheel.

Lastly, according to the related art, a tilting angle of the steering wheel is not adjusted. This is because the actual adjustment amount may vary depending on tilting up/mid/down even though the MDPS performs the zero adjustment on the wheel with the same driving amount by a gearbox pinion connected to the steering wheel, which varies depending on a change in tilting angle of the steering wheel, and an assembly angle (not illustrated) of a universal joint for adjusting the gearbox pinion.

Therefore, according to the embodiment of the present disclosure, the steering wheel adjustment apparatus captures image information of the steering wheel to solve the non-uniformity caused by the zero adjustment on the steering wheel of the operator and readjust the tilting angle of the steering wheel to a predetermined angle. That is, the steering wheel adjustment apparatus according to the embodiment of the present disclosure processes the images of the steering wheel captured at the multiple angles including a front side, a rear side, a left side, a right side, a top side, and a bottom side of the steering wheel, compares the image pressing result with the reference leveling information, and automatically controls the drive unit of the steering wheel so that the image pressing result has a difference at a predetermined level or lower from the reference leveling information. Therefore, it is possible to ensure the automatic adjustment of the steering wheel and improve the accuracy and reliability of the automatic adjustment.

FIG. 3 is a view illustrating a control mechanism of the steering wheel adjustment apparatus according to the embodiment of the present disclosure. As illustrated in FIG. 3, the image capturing unit of the steering wheel adjustment apparatus according to the embodiment of the present disclosure may be mounted on a cooperative robot and enter or exit the steering wheel of the vehicle. The control unit may be provided in the cooperative robot. The control unit C may be connected to a wheel alignment facility controller by means of communication. Therefore, the control unit C may be connected to an in-vehicle terminal having a communication unit T that may communicate with the wheel alignment facility controller. The in-vehicle terminal may be in communication with an MDPS controller for controlling the MDPS of the vehicle. Therefore, the control unit C may be provided in the cooperative robot. The control unit C may adjust the wheel off-center by automatically comparing the leveling information measured by the image processing with the reference leveling information, communicating with the MDPS controller, and controlling the MDPS.

FIG. 4 is a view illustrating an obstacle detection sensor of the steering wheel adjustment apparatus according to the embodiment of the present disclosure. The image capturing unit I further includes the obstacle detection sensor S, and the obstacle detection sensor may detect an obstacle on a route along which the image capturing unit I enters or exits the interior of the vehicle having the steering wheel to capture images of the current state of the steering wheel. Further, when a door glass of the vehicle is detected as an obstacle on the route, the control unit may execute control to open the door glass of the vehicle.

As illustrated in FIG. 4, the image capturing unit I may be provided on the cooperative robot. In particular, the image capturing unit I may be mounted on an end of an arm of the cooperative robot and capture images at multiple angles. An unexpected collision may occur when the cooperative robot enters the interior of the vehicle. Therefore, the cooperative robot may further include the obstacle detection sensor S. The obstacle detection sensor S may be positioned in the vicinity of the image capturing unit I. The obstacle detection sensor S may be an ultrasonic sensor. The obstacle detection sensor S may detect a position of an obstacle and a distance between the obstacle and the detection sensor and output and transmit sensing information to a drive controller for controlling an operation of the cooperative robot. Depending on the sensing information, the drive controller may execute control to stop the operation of the cooperative robot or the image capturing unit before a collision with the obstacle. Thereafter, when the obstacle detection sensor S detects the door glass of the vehicle as an obstacle on the movement route, the control unit may execute control to open the door glass of the vehicle. In this case, the detection of the door glass may be performed by processing the sensing data of the obstacle detection sensor S or image data and sensing data inputted from the obstacle detection sensor S and the image capturing unit I. After the door glass is opened under the control of the control unit, the image capturing unit provided on the cooperative robot enters the interior of the vehicle again and captures images of the steering wheel of the vehicle.

FIG. 5 is a view illustrating a tilting adjustment mechanism of the steering wheel adjustment apparatus according to the embodiment of the present disclosure. The analysis unit may measure a tilting angle of the steering wheel by processing the image of the lateral side of the current state of the steering wheel acquired by the image capturing unit and create the leveling information on the zero adjustment of the steering wheel corresponding to the measured tilting angle.

As illustrated in FIG. 5, the tilting of the steering wheel is measured depending on neutral (MID)/+gradient (UP)/gradient (DOWN). This measurement is performed as the analysis unit processes the image of the lateral side of the current state of the steering wheel acquired by the image capturing unit. When the analysis result indicates that the steering wheel is tilted by an angle larger than a first reference angle from the neutral state, the analysis unit creates the leveling information on the zero adjustment of the steering wheel for adjusting the tilting angle to set the tilting angle again. Depending on the error from the reference leveling information based on the neutral state based on the leveling information, the control unit controls the drive unit to set the tilting angle again.

Meanwhile, unlike the configuration illustrated in FIG. 5, the analysis unit of the steering wheel adjustment apparatus according to the embodiment of the present disclosure may measure a wheel off-center angle of the steering wheel by processing the image of the front side of the current state of the steering wheel acquired by the image capturing unit and create the leveling information on the zero adjustment of the steering wheel corresponding to the measured wheel off-center angle. That is, after the readjustment of the tilting angle, the analysis unit may measure the wheel off-center angle depending on the processed image and create the leveling information corresponding to the wheel off-center angle. In this case, as described above, the image processing of the analysis unit may load the image of the zero-adjusted reference steering wheel on the database in the state in which the types of the steering wheels are specified. Further, the image processing of the analysis unit may measure the wheel off-center angle depending on a difference between the two images.

FIG. 6 is a view illustrating a wheel off-center adjustment mechanism of the steering wheel adjustment apparatus according to the embodiment of the present disclosure. The analysis unit may further include a shape learning unit configured to create the reference leveling information by extracting a plurality of feature points related to a wheel shape from the image of the front side of the steering wheel.

As illustrated in FIG. 6, the shape learning unit learns the wheel shape from the image of the front side of the steering wheel. In this case, examples of a method of learning the shape may include a method of performing rule-based learning or deep-learning-based learning on the database related to the image of the front side of the steering wheel. According to the former case, the same types of steering wheels, which share most of the features, may be specified, and the feature points of the corresponding types of steering wheels may be extracted from the rules such as preset database and feature extraction algorithms. According to the latter case, when various types of steering wheels cannot be specified, the types of wheels are classified from the image of the front side of the steering wheel depending on the deep-learning technique, particularly, map learning or the like, and the feature points of the corresponding type of steering wheel may be extracted or a newly found feature point may be renewed in respect to the classified wheels.

FIG. 7 is a view illustrating a wheel off-center adjustment mechanism of the steering wheel adjustment apparatus according to the embodiment of the present disclosure. The analysis unit may extract the plurality of feature points related to the wheel shape from the image of the front side of the steering wheel acquired by the image capturing unit and create the leveling information on the zero adjustment of the steering wheel included in the steering wheel.

As illustrated in FIG. 7, the image processing of the analysis unit may be information on the plurality of wheel off-center angles measured by learning the images of the steering wheel captured at multiple angles based on the learning algorithm such as the deep-learning technique or the image processing technique, extracting the plurality of feature points that characterize the leveling angle of the steering wheel, and comparing angles between the plurality of feature points. FIG. 6 illustrates an image of a front side of a reference steering wheel W1 and an image of a front side of an image-captured steering wheel W2. In this case, the analysis unit extracts straight lines or curved lines of a, b, and c which are the feature points of the two steering wheel images. Further, the analysis unit creates the reference leveling information and the leveling information by measuring the angles between the feature points of the two steering wheel images, and the control unit may calculate the error.

FIG. 8 is a view illustrating the wheel off-center adjustment mechanism of the steering wheel adjustment apparatus according to the embodiment of the present disclosure. The image capturing unit may further include a focal point adjustment unit having a plurality of reference points for performing the zero adjustment on the focal point of the captured image.

FIG. 8 illustrates four reference points distributed in quadrants on the image of the front side of the steering wheel captured by the image capturing unit. According to all the embodiments of the present disclosure, the image captured by the image capturing unit is processed, and the adjustment of the steering wheel of the vehicle is automatically performed. Therefore, the adjustment of the image focal point of the image capturing unit is very important. However, in the case in which the image capturing unit is mounted on the cooperative robot or the like, a camera of the image capturing unit may be misaligned because of impact or the like, and thus the focal point may not be finely aligned. Therefore, the focal point adjustment unit periodically recognizes the fine misalignment from the zero adjustment in consideration of distances and angles between the plurality of reference points, a relationship between the feature points of the steering wheel, and a relationship between the centers of the steering wheels, and corrects the misalignment, thereby improving precision in measuring the angles based on the captured images of the steering wheel.

FIG. 9 is a flowchart of a steering wheel adjustment method according to the embodiment of the present disclosure. The steering wheel adjustment method according to the present disclosure includes step S100 of capturing, by the image capturing unit, images of the current state of the steering wheel at multiple angles, step S200 of creating, by the analysis unit, the leveling information on the zero adjustment of the steering wheel by processing the images acquired by the image capturing unit, step S300 of calculating, by the control unit, an error from the preset reference leveling information depending on the leveling information created by the analysis unit, step S400 of controlling the drive unit of the steering wheel depending on the calculated error, and step S500 of performing the zero adjustment on the drive unit.

As illustrated in FIG. 9, according to the steering wheel adjustment method according to the embodiment of the present disclosure, the image capturing unit captures images of the current state of the steering wheel at multiple angles first (S100). In this case, the multiple angles include the front side and the lateral side of the steering wheel. The image capturing angle or the focal point of the image may be physically misaligned because of external factors such as physical impact. Therefore, the capturing of the images may further include adjusting the misalignment.

Next, as illustrated in FIG. 9, according to the steering wheel adjustment method according to the embodiment of the present disclosure, the analysis unit creates the leveling information on the zero adjustment of the steering wheel by processing the image acquired by the image capturing unit (S200). In this case, the drive unit includes the tilt/telescopic device for ensuring a steering convenience for the driver and driving safety by adjusting the motor-driven power steering (MDPS) for assisting the driver in steering, adjusting an inclination angle of the shaft to which the steering wheel is attached, adjusting a position of the steering wheel upward and downward (tilting motion), or pushing or pulling the steering wheel forward and rearward (telescopic motion) by operating the drive motor.

Next, as illustrated in FIG. 9, according to the steering wheel adjustment method according to the embodiment of the present disclosure, the control unit calculates the error from the preset reference leveling information depending on the leveling information created by the analysis unit (S300). In this case, the reference leveling information may be a database related to the corresponding types of steering wheels including information on the tilting/telescoping/wheel off-center as a leveling angle of the steering wheel which is zero-adjusted in a state in which the types of steering wheels are specified or has a difference corresponding to a reference error during the zero adjustment. Alternatively, the reference leveling information may be information on feature points that characterize the leveling angle of the steering wheel extracted by learning the images of the steering wheel at multiple angles in a state in which the types of steering wheels are specified depending on learning algorithms such as deep learning techniques or image processing techniques.

Lastly, as illustrated in FIG. 9, according to the steering wheel adjustment method according to the embodiment of the present disclosure, the drive unit of the steering wheel is controlled depending on the calculated error (S400), and the zero adjustment is performed on the drive unit (S500). Likewise, the drive unit includes the motor driven power steering (MDPS) and the tilt/telescopic device that operates the drive motor to assist the driver in steering.

FIG. 9 is a flowchart of the steering wheel adjustment method according to the embodiment of the present disclosure. The steering wheel adjustment method further includes, before the capturing of the images (S100), detecting, by the obstacle detection sensor, an obstacle on the route along which the image capturing unit enters or exits the interior of the vehicle having the steering wheel to capture the image of the current state of the steering wheel.

In the creating of the leveling information (S200), the tilting angle of the steering wheel may be measured by processing the acquired image of the lateral side of the current state of the steering wheel, and the leveling information on the zero adjustment of the steering wheel corresponding to the measured tilting angle may be created.

In the creating of the leveling information (S200), the wheel off-center angle of the steering wheel may be measured by processing the acquired image of the front side of the current state of the steering wheel, and the leveling information on the zero adjustment of the steering wheel corresponding to the measured wheel off-center angle.

The steering wheel adjustment method may further include, before the creating of the leveling information (S200), creating, by the shape learning unit, the reference leveling information by extracting the plurality of feature points related to the wheel shape from the image of the front side of the steering wheel.

FIG. 9 is the flowchart of the steering wheel adjustment method according to the embodiment of the present disclosure. In the creating of the leveling information (S200), the leveling information on the zero adjustment of the steering wheel may be created by extracting the plurality of feature points related to the wheel shape from the image of the front side of the steering wheel acquired by the image capturing unit.

The steering wheel adjustment method may further include, before the capturing of the images (S100), performing, by the focal point adjustment unit, the zero adjustment on the focal point of the image captured depending on the plurality of reference points.

Because the detailed technical features in the respective steps of the steering wheel adjustment method according to the present disclosure are identical or similar to the respective technical features of the respective configurations of the steering wheel adjustment apparatus according to the present disclosure described above, detailed descriptions thereof will be omitted.

Meanwhile, the term “unit” in the present embodiment may be software, hardware, or a combination thereof. In addition, the term “unit” in the present embodiment may be included in a computer-readable storage medium. In addition, the term “unit” in the present embodiment may be partially dispersed and distributed in a plurality of hardware or software components or a combination thereof. Further, the term “unit” in the present embodiment may be configured as a hardware component so as to operate as one or more software modules, and the opposite is also possible.

In addition, the method of “controlling the drive unit of the steering wheel depending on the error” in the present embodiment includes basic control such as PD, PI, and PID control, PI-D control as two-degree-of-freedom control in which defect controllers are placed in the feed-forward path and the feedback path, lag compensation control such as PI-PD control, lead-lag compensation control, series compensation or parallel compensation thereof, and compliance control.

While the specific embodiments of the present disclosure have been illustrated and described above, it will be obvious to those skilled in the art that the present disclosure may be variously modified and changed without departing from the technical spirit of the present disclosure defined in the appended claims.

Therefore, it is apparent to those skilled in the field of the vehicle that the term "unit" or "step" in the embodiment of the present disclosure may implement one new embodiment by being combined with the term "unit" or "step" of different embodiments of the present disclosure. For example, it is apparent to those skilled in the art that it is possible to configure a new embodiment in which the image capturing unit of the steering wheel adjustment apparatus according to the embodiment of the present disclosure further includes the obstacle detection sensor, and the control unit performs control to open the door glass of the vehicle when the door glass of the vehicle is detected as an obstacle on the route.

As another example, it is apparent to those skilled in the art that the tilting angle of the steering wheel may be measured by processing the image of the lateral side of the current state of the steering wheel acquired by the steering wheel adjustment method according to the embodiment of the present disclosure, the leveling information on the zero adjustment of the steering wheel corresponding to the measured tilting angle may be created, the wheel off-center angle of the steering wheel may be measured by processing the acquired image of the front side of the current state of the steering wheel, and the leveling information on the zero adjustment of the steering wheel corresponding to the measured wheel off-center angle may be created.

What is claimed is:

1. An apparatus configured to adjust a steering wheel, the apparatus comprising:

an image capturing module comprising a camera configured to capture images of a current state of a steering wheel at multiple angles;

an analysis module configured to create leveling information on zero adjustment of the steering wheel by processing the image acquired by the image capturing module; and a control module configured to calculate an error from preset reference leveling information depending on the leveling information created by the analysis module and to perform the zero adjustment on the steering wheel by controlling a drive module configured to operate the steering wheel depending on the calculated error;

wherein the analysis module further comprises a shape learning module configured to create reference leveling information by extracting a plurality of feature points related to a wheel shape from an image of a front side of the steering wheel;

wherein the analysis module is configured to create the leveling information on the zero adjustment of the steering wheel by extracting the plurality of feature points related to the wheel shape from the image of the front side of the steering wheel acquired by the image capturing module;

wherein the shape learning module is configured to create the preset reference leveling information by extracting the plurality of feature points from a reference image and measuring the angles between the plurality of feature points, wherein the analysis module is configured to create the leveling information by extracting the plurality of features from the image acquired by the image capturing module and measuring the angles between the plurality of feature points, wherein the control module is configured to calculate an error between an angle of the preset reference leveling information and an angle of the leveling information, wherein the analysis module is configured to measure a tilting angle of the steering wheel by processing an image of a lateral side of the current state of the steering wheel acquired by the image capturing module and create the leveling information on the zero adjustment of the steering wheel corresponding to the measured tilting angle, and wherein the control module is configured to control the drive module to set the tilting angle again, based on the error between the reference leveling information based on the neutral state and the leveling information, and wherein the shape learning module is configured to learn the wheel shape by performing rule-based learning or deep-learning-based learning on a database related to the image of the front side of the steering wheel.

2. The apparatus of claim 1, wherein the image capturing module further comprises an obstacle detection sensor, and the obstacle detection sensor is configured to detect an obstacle on a route along which the image capturing module enters or exits an interior of a vehicle having the steering wheel to capture the image of the current state of the steering wheel.

3. The apparatus of claim 2, wherein when a door glass of the vehicle is detected as an obstacle on the route, the control module performs control to roll down the door glass of the vehicle.

4. The apparatus of claim 1, wherein the analysis module measures a wheel off-center angle of the steering wheel by processing an image of a front side of the current state of the steering wheel acquired by the image capturing module and creates the leveling information on the zero adjustment of the steering wheel corresponding to the measured wheel off-center angle.

5. The apparatus of claim 1, wherein the image capturing module further comprises a focal point adjustment module having a plurality of reference points and being configured to perform the zero adjustment on a focal point of the captured image based on the plurality of reference points.

6. A method of adjusting a steering wheel, the method comprising:

capturing, by an image capturing module, images of a current state of a steering wheel at multiple angles;

creating, by an analysis module, leveling information on zero adjustment of the steering wheel by processing the image acquired by the image capturing module; and calculating, by a control module, an error from preset reference leveling information depending on the leveling information created by the analysis module, controlling a drive module of the steering wheel depending on the calculated error, and performing the zero adjustment on the drive module;

further comprising, before the creating of the leveling information, creating, by a shape learning module, reference leveling information by extracting a plurality of feature points related to a wheel shape from a reference image of a front side of the steering wheel and measuring the angles between the plurality of feature points;

wherein in the creating of the leveling information, the leveling information on the zero adjustment of the steering wheel is created by extracting a plurality of feature points related to a wheel shape from the image of the front side of the steering wheel acquired by the image capturing module and measuring the angles between the plurality of feature points;

wherein the calculating an error comprises calculating an error between angle of the reference leveling information and angle of the leveling information, wherein in the creating of the leveling information, a tilting angle of the steering wheel is measured by processing an acquired image of a lateral side of the current state of the steering wheel, and the leveling information on the zero adjustment of the steering wheel corresponding to the measured tilting angle is created, and wherein in the controlling the drive module comprises controlling the drive module to set the tilting angle angel again, based on the error between the reference leveling information based on the neutral state and the leveling information, and wherein in the creating of the reference leveling information, the wheel shape is learned by performing rule-based learning or deep-learning-based learning on a database related to the image of the front side of the steering wheel.

7. The method of claim 6, further comprising:

before the capturing of the images, detecting, by an obstacle detection sensor, an obstacle on a route along which the image capturing module enters or exits an interior of a vehicle having the steering wheel to capture the image of the current state of the steering wheel.

8. The method of claim 6, wherein in the creating of the leveling information, a wheel off-center angle of the steering wheel is measured by processing an acquired image of a front side of the current state of the steering wheel, and the leveling information on the zero adjustment of the steering wheel corresponding to the measured wheel off-center angle is created.

9. The method of claim 7, further comprising:

before the capturing of the images, performing, by a focal point adjustment mode having a plurality of reference points, the zero adjustment on a focal point of the captured image based on the plurality of reference points.

* * * * *